United States Patent
Bender et al.

(10) Patent No.: US 6,888,805 B2
(45) Date of Patent: May 3, 2005

(54) TIME MULTIPLEXED TRANSMISSION SCHEME FOR A SPREAD SPECTRUM COMMUNICATION SYSTEM

(75) Inventors: Paul Bender, San Diego, CA (US); Ahmad Jalali, San Diego, CA (US); Bruce Judson, San Luis Obispo, CA (US); Roberto Padovani, San Diego, CA (US); Charles E. Wheatley, III, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 378 days.

(21) Appl. No.: 09/816,558

(22) Filed: Mar. 23, 2001

(65) Prior Publication Data

US 2003/0012174 A1 Jan. 16, 2003

(51) Int. Cl.[7] .......................... H04Q 7/00; H04Q 7/20; H04J 3/00; H04B 7/216
(52) U.S. Cl. ...................... 370/314; 370/337; 370/335; 455/443
(58) Field of Search ................................ 370/335, 314, 370/329, 337, 341, 431, 347, 328, 345, 458, 442, 351, 350, 342, 437, 395, 503, 507, 508; 455/443, 447, 524, 63, 67.3, 133, 135; 375/227

(56) References Cited

U.S. PATENT DOCUMENTS

| | | | |
|---|---|---|---|
| 5,859,612 A | | 1/1999 | Gilhousen |
| 5,970,413 A | | 10/1999 | Gilhousen |
| 6,011,974 A | | 1/2000 | Cedervall et al. |
| 6,016,117 A | | 1/2000 | Nelson, Jr. |
| 6,049,303 A | | 4/2000 | Biacs et al. |
| 6,075,987 A | | 6/2000 | Camp, Jr. et al. |
| 6,094,429 A | * | 7/2000 | Blanchette et al. ......... 370/347 |
| 6,144,652 A | * | 11/2000 | Avidor et al. ............... 370/336 |
| 6,243,371 B1 | * | 6/2001 | Chawla et al. ............... 370/347 |
| 6,493,331 B1 | * | 12/2002 | Walton et al. ............... 370/341 |
| 6,504,837 B1 | * | 1/2003 | Menzel ....................... 370/351 |
| 6,721,834 B2 | * | 4/2004 | Das et al. .................... 370/342 |

FOREIGN PATENT DOCUMENTS

| | | |
|---|---|---|
| DE | 19928579 | 1/2000 |
| DE | 19840510 | 3/2000 |
| EP | 1037489 | 3/2002 |
| WO | 0054533 | 9/2000 |
| WO | 0108438 | 2/2001 |
| WO | 0074425 | 12/2002 |

OTHER PUBLICATIONS

Mohr, "The utra concept, Europe's Proposal to IMT-2000", *Global Telecomm Conference*, pp. 2683–2688, 1999.
Ojanpera T., et al., "Comparison of Multiple Access Schemes for UMTS", *IEEE Vehicular Technology Conference*, pp. 490–494, May 1997.

* cited by examiner

*Primary Examiner*—Hanh Nguyen
(74) *Attorney, Agent, or Firm*—Philip Wadsworth; Sandra L. Godsey; Thomas R. Rouse

(57) ABSTRACT

A "time multiplexed" transmission scheme capable of reducing the amount of interference from other cells operated at the same frequency band. Each cell in a system transmits in designated time intervals (e.g., time slots) during which other interfering cells may be prevented from transmitting. By temporarily "blanking" transmissions from interfering cells during the designated time slots, the amount of interference from these cells is reduced. The improved signal quality may support transmission at a desired or higher data rate, which may not be possible without cell blanking. In one variant, transmissions from the cells are staggered over different time slots. A set of one or more cells may be designated to transmit in each of a number of slot phases. The cells transmit in a staggered manner on these phases to reduce interference. The transmission scheme may be used for a various channel types (e.g., a control channel) and applications.

16 Claims, 9 Drawing Sheets

TIME MULTIPLEXED TRANSMISSION SCHEME FOR A SPREAD SPECTRUM COMMUNICATION SYSTEM

BACKGROUND

1. Field

The present invention relates to data communication. More particularly, the present invention relates to a novel and improved transmission scheme for a spread spectrum communication system.

2. Background

Wireless communication systems are widely deployed to provide various types of communication such as voice, data, and so on. These systems may be based on code division multiple access (CDMA), time division multiple access (TDMA), or some other multiple access techniques. A CDMA system provides certain advantages over other types of system, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the cdma2000 standard), and (5) some other standards. These standards are incorporated herein by reference. A system that implements the High Rate Packet Data specification of the cdma-2000 standard is referred to herein as a high data rate (HDR) system.

In a CDMA system, to achieve better utilization of the available resources, the cells within the system may be operated to transmit on a common frequency band (i.e., for a frequency reuse of one, or K=1). For this system, the transmission from each access point (i.e., base station) acts as interference to the transmissions from other access points. The interference is especially severe for a transmission received by an access terminal (i.e., a remote terminal) located at or near the boundary between cells. The interference may also be worse in a system designed to transmit at or near full power, if at all, such as the HDR system.

For a user-specific data transmission to a disadvantaged access terminal experiencing a high level of interference, the data rate of the transmission may be reduced to achieve the required signal quality for the desired level of performance (e.g., a one percent packet error rate). However, for an overhead channel, such as a control channel or a broadcast channel, designed to transmit messages to a number of access terminals within a cell, it is typically not practical to adjust the data rate on the overhead channel based on the operating conditions experienced by individual access terminals. Typically, a sufficiently low data rate is selected such that the overhead channel may be properly received by a large percentage of the access terminals within the cell. For example, the control channel in the HDR system is transmitted at a low data rate of 38.4 kbps or 76.8 kbps, while a traffic channel may be transmitted at data rates ranging from 38.4 kbps to 2.4576 Mbps depending on the link conditions.

In certain instances, a transmission at even the lowest system data rate (e.g., 38.4 kbps) may not be properly received by a disadvantaged access terminal because of excessive interference from other cells. In certain other instances, it may be advantageous to transmit the overhead channel at higher data rates (e.g., to provide increased transmission capacity on the overhead channel, to reduce the delay or latency of control messages transmitted on the overhead channel, to allow data transmission on traffic channels to start sooner if it is dependent on a control message, and so on).

As can be seen, a transmission scheme that may be used to reduce interference and which may support a particular desired data rate (e.g., the lowest system data rate or a higher data rate) in a CDMA communication system is highly desirable.

SUMMARY

The present invention provides a "time multiplexed" transmission scheme capable of reducing the amount of interference from other cells operated at the same frequency band. In accordance with this transmission scheme, each cell in a system transmits in designated time intervals (or time slots) during which other interfering cells may be prevented from transmitting. By temporarily "blanking" transmissions from the interfering cells during the designated time slots, the amount of interference from these cells is reduced. The improved signal quality at the transmitting cell may support transmission of signaling (e.g., messages) and data at a desired data rate or at a higher data rate, which may not be possible without blanking the interfering cells. The time multiplexed transmission scheme effectively implements a "reuse in time" to reduce the amount of interference from other cells.

In one variant of the time multiplexed transmission scheme, which is referred to herein as a "staggered" transmission scheme, transmissions from the cells occur over staggered time slots. In this scheme, a first set of one or more cells may be designated to transmit in one time slot, a second set of one or more cells may be designated to transmit in the next time slot, and so on. In one specific implementation, the available time slots are associated with four different phases (e.g., phases 0, 1, 2, and 3). The cells may then be designated to transmit in a staggered manner on these four phases. The set of cells designated to transmit in each phase (and the amount of staggering) may be selected to achieve the necessary reduction in interference to provide the desired signal quality at the selected data rate.

The time multiplexed transmission scheme (and the staggered transmission scheme) may be used to implement a time reuse scheme, which may provide performance comparable to that of a frequency reuse scheme. However, the time reuse scheme provides numerous advantages. For example, the time reuse factor may be flexibly selected (e.g., based on the system's operating conditions and needs) and dynamically adjusted to achieve the desired results. Moreover, the time duration over which to apply the time multiplexed transmission scheme may also be flexibly selected (e.g., statistically selected by the system).

The time multiplexed (and the staggered) transmission scheme may be advantageously used for a control channel, a traffic channel, a broadcast channel, or some other channel types. This transmission scheme is especially advantageous when the frequency reuse factor for the system is low (e.g., K=1), and may be used for various applications and scenarios. For example, the transmission scheme may be used to reduce interference to support a particular data rate (e.g., the lowest system data rate or a higher data rate) that would not be supported without reducing the interference. The scheme may also be used to provide a variable-rate control channel, a high rate broadcast channel, and so on. The scheme may further be used to transmit to a disadvantaged access terminal by (temporarily) blanking the major interfering cell(s). Various other applications for the time multiplexed transmission scheme are also possible.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
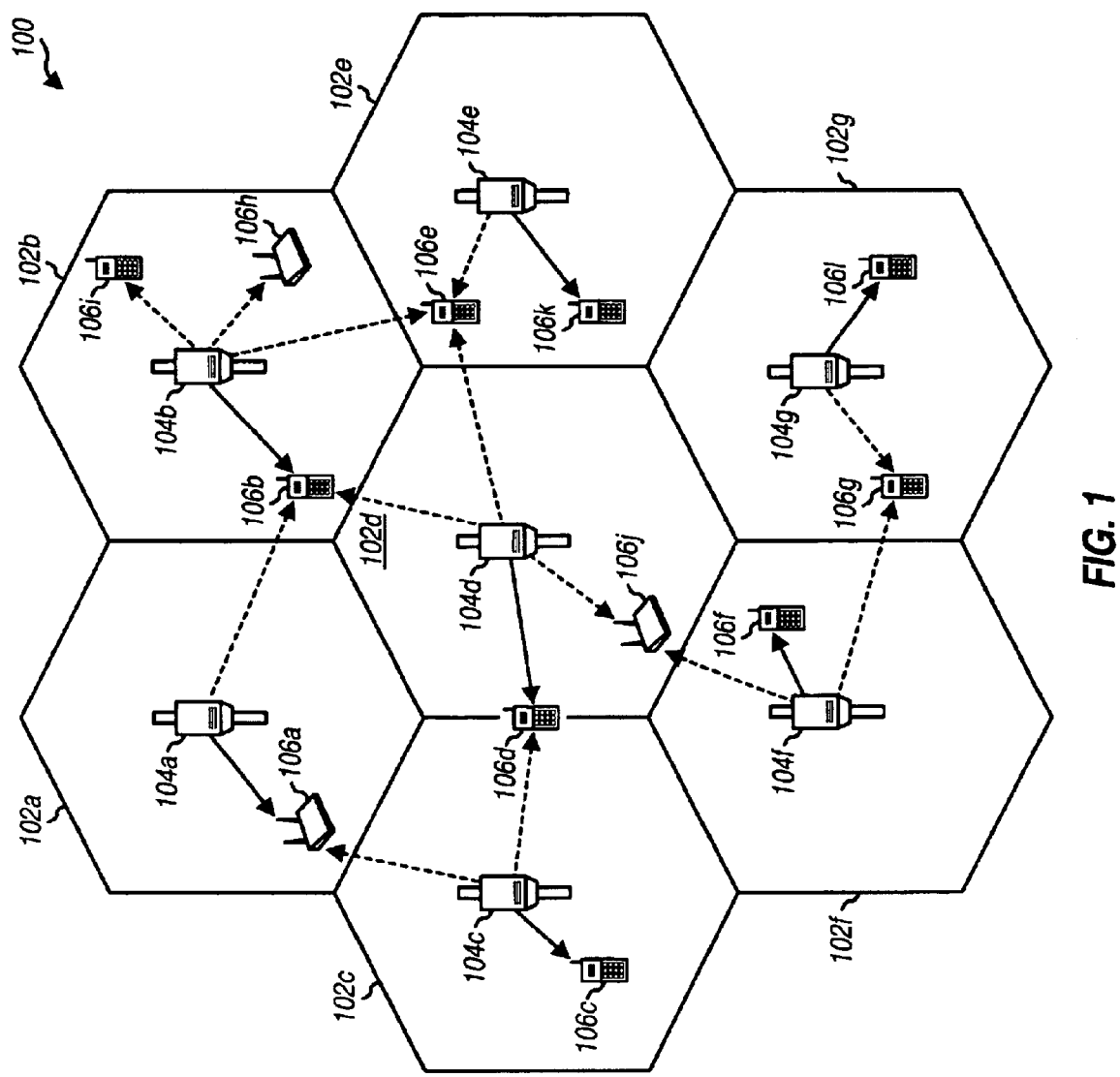
FIG. 1 is a diagram of a wireless communication system that supports a number of users, and which can implement various aspects of the invention.

FIG. 1 is a diagram of a wireless communication system 100 that supports a number of users, and which can implement various aspects of the invention. System 100 provides communication for a number of geographic areas 102a through 102g, with each geographic area 102 being serviced by a corresponding access point 104 (which may also be referred to as a base station). The access point and its coverage area are often collectively referred to as a "cell."

Various access terminals 106 (which may also be referred to as remote terminals or mobile stations) are dispersed throughout the system. In an embodiment, each access terminal 106 may communicate with one access point 104 on the forward link at any given moment, and may communicate with one or more access points on the reverse link depending on whether the access terminal is in soft handoff. The forward link (i.e., downlink) refers to transmission from the access point to the access terminal, and the reverse link (i.e., uplink) refers to transmission from the access terminal to the access point. System 100 may be designed to support one or more CDMA standards and/or designs (e.g., the cdma2000 standard).

In FIG. 1, a solid line with an arrow indicates a user-specific data transmission from an access point to an access terminal. A broken line with an arrow indicates that the access terminal is receiving the pilot reference and other signaling, but no user-specific data transmission from the access point. As shown in FIG. 1, access point 104a transmits data to access terminal 106a on the forward link, access point 104b transmits data to access terminal 106b, access point 104c transmits data to access terminal 106c, and so on. The uplink communication is not shown in FIG. 1 for simplicity.

Figure 2C:
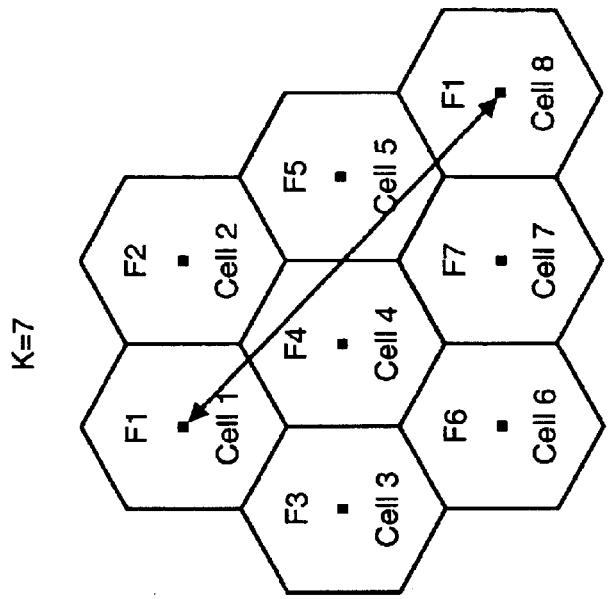
FIGS. 2A through 2C are diagrams of a communication system whereby the cells are operated at frequency reuse factors of one, three, and seven, respectively.
Figure 2B:
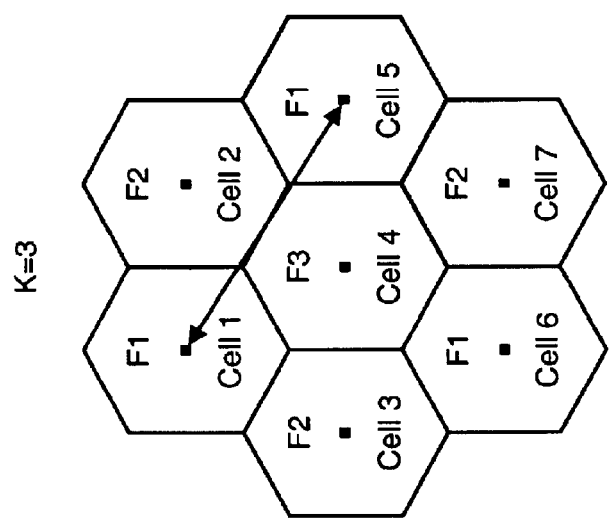
Figure 2A:
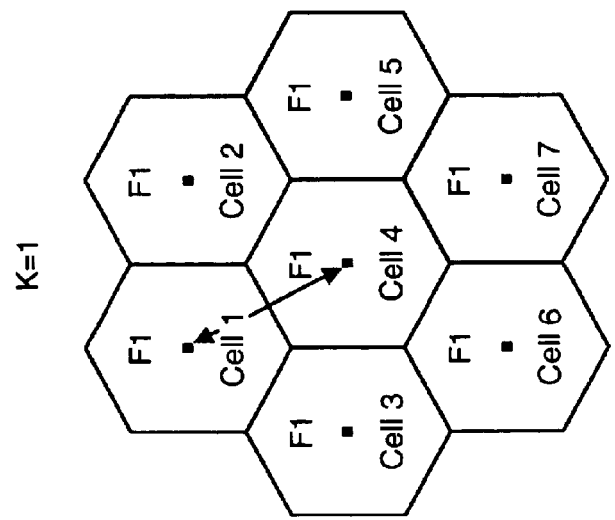

FIG. 2A is a diagram of a communication system whereby the cells are operated at the same frequency band (i.e., for a frequency reuse factor of one, or K=1). Each cell is typically operated to transmit at a particular (e.g., cellular or PCS) frequency band designated by the system operator. If two or more cells are operated at the same frequency band (e.g., 900 MHz), the transmission from one cell acts as interference to the transmissions from other cells in the system. For an access terminal located at or near a cell boundary (such as access terminal 106d in FIG. 1), the interference from the neighboring cells (e.g., access point 104c) degrades the signal quality of the data transmission received at the access terminal. As a result, the data rate of the transmission to this access terminal needs to be reduced to achieve the desired level of performance (e.g., one percent packet error rate).

FIG. 2C is a diagram of a communication system whereby the cells are operated at different frequency bands to reduce the amount of interference. As shown in FIG. 2C, for a frequency reuse factor of 7 (K=7), cells 1 through 7 are operated at frequency bands F1 through F7, respectively. Since the six neighboring cells around each cell (e.g., cell 4) are operated at frequencies different from that of the center cell, the amount of interference from these neighboring cells on a data transmission from the center cell is minimal (or essentially none). For a particular cell (e.g., cell 1) in the layout shown in FIG. 2C, the in-band interference is from cells located in a third ring around the cell (i.e., with the first ring being comprised of cells 2, 3, and 4, and the second ring being comprised of cells 5, 6, and 7). Because of the longer distance to the interfering cells, the interference from these cells is greatly reduced and a higher data rate may be supported by cell 1.

FIG. 2B is a diagram of a communication system operated with a frequency reuse factor of 3 (K=3). Again, for the layout shown, the six neighboring cells around cell 4 are operated at frequencies different from that of cell 4, and the amount of interference from these neighboring cells on a transmission from cell 4 is also minimal. For a particular cell (e.g., cell 1), the in-band interference is from cells located in the second ring around the cell, and the interference from these cells is reduced relative to the interference for a frequency reuse factor of 1.

As shown in FIGS. 2A through 2C, the distance between cells operating at the same frequency band increases with an increasing frequency reuse factor. The increased distance results in reduced interference between cells for higher reuse factors. However, a high reuse factor (e.g., K=7 in FIG. 2C) requires additional bandwidth since each available frequency band is on the average used $1/K^{th}$ of the time, or that K frequency bands are needed to support the system. For improved utilization of the available resources, a CDMA system may be operated with a frequency reuse factor of one (i.e., K=1), in which case the cells in the system all transmit on the same frequency band. Higher level of interference results from the cells using the same frequency band.

An aspect of the invention provides a "time multiplexed" transmission scheme capable of reducing the amount of interference from other cells operated at the same frequency band. In accordance with this transmission scheme, each cell in the system transmits in designated time intervals (or time slots) during which other interfering cells may be prevented from transmitting. By temporarily "blanking" transmissions from the interfering cells during the designated time intervals, the amount of interference from these cells is reduced. The improved signal quality in the transmitting cell may support transmission of signaling (e.g., messages) and data at a desired data rate or at a higher data rate, which may not be possible without blanking the interfering cells. The time multiplexed transmission scheme effectively implements a "reuse in time" to reduce the amount of interference from other cells.

In one variant of the time multiplexed transmission scheme, which is referred to herein as a "staggered" transmission scheme, transmissions from the cells occur over staggered time slots. In this scheme, a first set of one or more cells may be designated to transmit in one time slot, a second set of one or more cells may be designated to transmit in the next time slot, and so on. The set of cells designated to transmit in each time slot may be selected to achieve the necessary reduction in interference to provide the desired signal quality.

Figure 3:
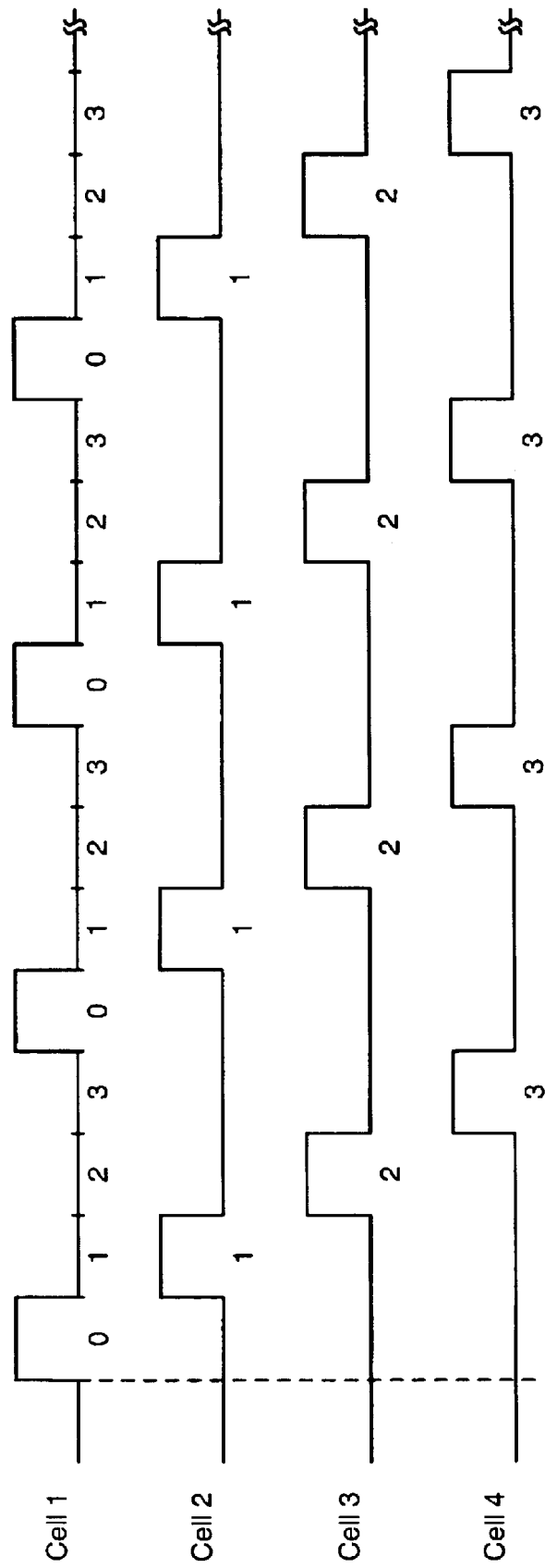
FIG. 3 is a timing diagram of an embodiment of a staggered transmission scheme, which may be used to reduce the amount of interference from cells operating at the same frequency band.

FIG. 3 is a timing diagram of an embodiment of a staggered transmission scheme, which may be used to reduce the amount of interference from cells operating at the same frequency band. As shown in FIG. 3, a data transmission occurs in time slots, with each time slot covering a particular time interval (e.g., 1.667 msec for the HDR system). In a specific embodiment, the time slots are designated with four different "phases" numbered from 0 through 3. Different number of phases (e.g., two, eight, and so on) may also be used and are within the scope of the invention.

In an embodiment, each cell is designated to transmit on zero or more phases for a particular duration of time. For the example shown in FIG. 3, cell 1 is designated to transmit on phase 0, cell 2 is designated to transmit on phase 1, cell 3 is designated to transmit on phase 2, and cell 4 is designated to transmit on phase 3. Other cells may also be allowed to transmit on any one of these phases. For example, cells 5 and 6 may also be designated to transmit on phase 0, and cell 7 may be designated to transmit on phase 1.

For clarity, various aspects and embodiments of the invention are now described for a specific implementation for a control channel in the HDR system.

Figure 4:
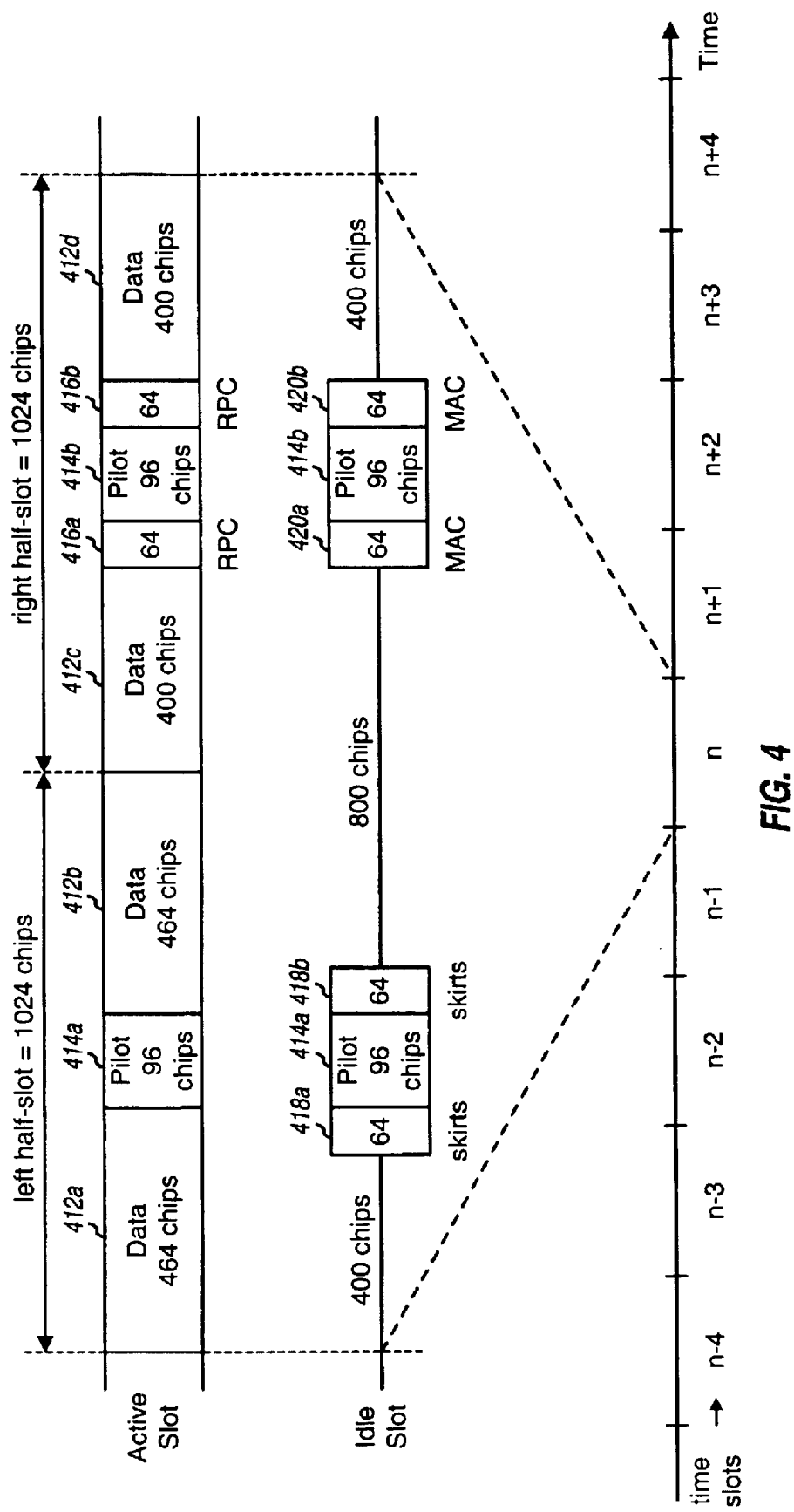
FIG. 4 is a diagram of a transmission format defined by the HDR system.

FIG. 4 is a diagram of a transmission format defined by the HDR system. As shown in FIG. 4, data and signaling are transmitted in slots, with each slot covering a particular time interval (e.g., 1.667 msec for the HDR system). Each "active" slot is divided into two half-slots, with each half-slot including two data partitions 412 separated by a pilot burst 414. Data partitions 412 may be used to transmit user-specific data and signaling, and pilot bursts 414 may be used to transmit a pilot reference.

The first (i.e., left) half-slot includes data partitions 412a and 412b separated by pilot burst 414a, and the second (i.e., right) half-slot includes data partitions 412c and 412d separated by pilot burst 414b. The width of each pilot burst can be selected based on various factors. As defined by the HDR system, each pilot burst comprises 96 chips of a particular data pattern (e.g., all zeros data). The second half-slot further includes two signaling bursts 416a and 416b placed on both sides of pilot burst 414b and used to implement a signaling channel. The signaling channel may be used, for example, to transmit reverse power control (RPC) information when the slot is active and Media Access Control (MAC) information when the slot is idle. The RPC information is sent to direct the access terminals to adjust their transmit power either up or down to achieve the desired signal quality at the receiving access point.

As also shown in FIG. 4, each "idle" slot is also divided into two half-slots, and each half-slot also includes one pilot burst 414 of the same width (e.g., 96 chips) and located in the same position in the half-slot as for the active slot. The pilot bursts for the idle slot are essentially indistinguishable from the pilot bursts for the active slot. Two skirts 418a and 418b are positioned on both sides of pilot burst 414a in the first half-slot of the idle slot, and two signaling bursts 420a and 420b are placed on both sides of pilot burst 414b in the second half-slot. Skirts 418a and 418b are used to provide a transition period between blank (or no) transmission and pilot transmission. This transition period allows the pilot reference to reach or be near its steady state value for the duration of the (e.g., 96-chip) pilot burst.

In the HDR system, a MAC Layer provides the rules that govern the operation of a control channel, an access channel, a forward traffic channel, and a reverse traffic channel supported by the system. The MAC Layer includes, among others, a Control Channel MAC Protocol that (1) builds Control Channel MAC Layer packets out of one or more (higher layer) Security Layer packets, and (2) contains the rules concerning (a) access network transmission and packet scheduling on the control channel, (b) access terminal acquisition on the control channel, and (c) access terminal Control Channel MAC Layer packet reception.

Figure 5:
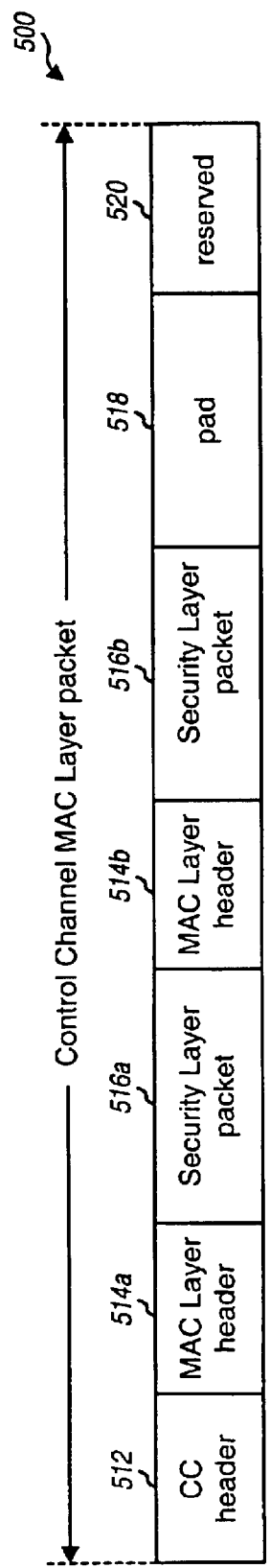
FIG. 5 is a diagram of an embodiment of a Control Channel MAC Layer packet.

FIG. 5 is a diagram of an embodiment of a Control Channel MAC Layer packet 500 used to send control information from an access point to one or more access terminals. As shown in FIG. 5, packet 500 includes a control channel (CC) header 512, zero or more Security Layer packets 516 with their associated MAC Layer header 514 (two Security Layer packets are shown in FIG. 5), a pad field 518, and a reserved field 520. In an embodiment, CC header 512 includes information indicating the particular slot "phase" or "offset" assigned to the packet, as described in further detail below. Each Security Layer packet 516 and its associated MAC Layer header 514 include a message intended for a specific access terminal. Pad field 518 is used to fill the unused bit positions in packet 500. And reserved field 520 includes one or more bits reserved for future use. In an embodiment, each Control Channel MAC Layer packet includes a particular fixed number of bits (e.g., 1024 bits for the HDR system).

Each Control Channel MAC Layer packet 500 is processed (e.g., encoded, interleaved, and modulated) to provide a number of data modulation symbols. For the HDR system, each data modulation symbol represents a complex value that includes an inphase (I) component and a quadrature (Q) component used for either QPSK, 8-PSK, or 16-QAM modulation. In the HDR system, the modulation type to be used is dependent on the data rate used to transmit the packet. The data modulation symbols are further processed (e.g., repeated/punctured, channelized, and covered) and then time-division multiplexed (TDM) with other information (e.g., pilot, RPC, and MAC) to form a number of slots having the format shown in FIG. 4.

Table 1 lists various parameters for some of the possible data rates that may be supported by a control channel transmitted using a transmission scheme of the invention. Additional data rates may also be supported but are not shown in Table 1 for simplicity. In the HDR system, each Control Channel MAC Layer packet is transmitted via a single Physical Layer packet. The Physical Layer packet is then partitioned into one or more slots, with the number of slots (column 2) being dependent on the data rate (column 1) to be used for the packet transmission. Each slot is transmitted over a single time slot.

TABLE 1

| | | | Number of Values per Physical Layer Packet | | | | |
|---|---|---|---|---|---|---|---|
| Data Rate (kbps) | Slots | Bits | MOD Symbols Provided | MOD Symbols Needed | Full Sequence Trans | MOD Symbols In Last Partial Trans | Repetition Factor |
| 38.4 | 16 | 1,024 | 2,560 | 24,576 | 9 | 1,536 | 9.6 |
| 76.8 | 8 | 1,024 | 2,560 | 12,288 | 4 | 2,048 | 4.8 |
| 153.6 | 4 | 1,024 | 2,560 | 6,144 | 2 | 1,024 | 2.4 |
| 307.2 | 2 | 1,024 | 2,560 | 3,072 | 1 | 512 | 1.2 |

For the data rates listed in Table 1, each Control Channel MAC Layer packet is processed to provide a sequence of 2,560 data modulation symbols (column 4). For each data rate, a number of data modulation symbols are needed (column 5) for the data partitions in the assigned slots. Since the number of needed data modulation symbols (column 5) is greater than the number of data modulation symbols in the sequence (column 4) for the data rates shown, the sequence is transmitted in full a number of times (column 6). A portion of the sequence (column 7) is also transmitted such that the needed number of data modulation symbols (column 5) is obtained. The sequence is thus effectively replicated a number of times (column 8) in the data partitions of the slots assigned for the packet.

Table 2 lists various parameters for a Physical Layer packet for some data rates in the HDR system. Each Physical Layer packet is transmitted over a number of slots (column 2) having the total number of chips listed in column 4. The packet data is time-division multiplexed with a preamble, the pilot, and MAC information. Of the total number of chips in the assigned slots, the number of chips for the preamble, pilot, MAC, and packet data are shown in columns 5 through 8, respectively.

TABLE 2

| | | | Number of Values per Physical Layer Packet | | | | |
|---|---|---|---|---|---|---|---|
| Data Rate (kbps) | Slots | Bits | Total Chips | Preamble Chips | Pilot Chips | MAC Chips | Data Chips |
| 38.4 | 16 | 1,024 | 32,768 | 1,024 | 3,072 | 4,096 | 24,576 |
| 76.8 | 8 | 1,024 | 16,384 | 512 | 1,536 | 2,048 | 12,288 |

TABLE 2-continued

| | | | Number of Values per Physical Layer Packet | | | | |
|---|---|---|---|---|---|---|---|
| Data Rate (kbps) | Slots | Bits | Total Chips | Preamble Chips | Pilot Chips | MAC Chips | Data Chips |
| 153.6 | 4 | 1,024 | 8,192 | 256 | 768 | 1,024 | 6,144 |
| 307.2 | 2 | 1,024 | 4,096 | 128 | 384 | 512 | 3,072 |

In the HDR system, a preamble is appended at the start of each Physical Layer packet in order to assist the access terminal with synchronization of each variable-rate transmission. The preamble is an all zeros sequence that is covered with a particular 32-chip bi-orthogonal sequence and transmitted on the inphase component of the modulated signal. The particular 32-bit sequence is selected from 64 possible 32-bit sequences, which are made up of 32 32-ary Walsh functions and their bit-by-bit complements. The particular 32-bit sequence is also used to identify the control channel, and to allow the access terminal to distinguish this control channel from one or more forward traffic channels that may also be transmitted in a time-division multiplexed manner with the control channel.

The length of the preamble is dependent on the data rate of the transmission, as shown in Table 2. The 32-chip preamble sequence is repeated a number of times to fill the allocated partitions for the preamble. For example, for the 38.4 kbps data rate, the 32-chip preamble sequence is repeated 32 times to provide 1024 preamble chips.

Figure 6A:
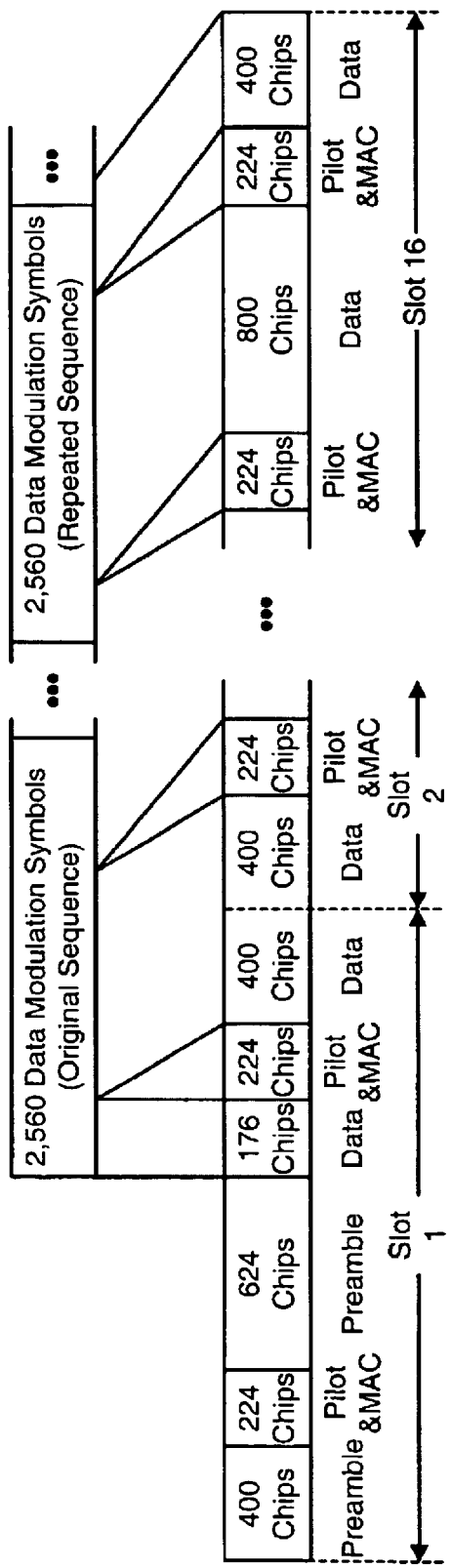
FIGS. 6A and 6B are diagrams showing the time-division multiplexing of packet data, preamble, pilot, and MAC to form slots for the 38.4 kbps and 76.8 kbps data rates, respectively, in accordance with the HDR system.

FIG. 6A is a diagram showing the time-division multiplexing of packet data, preamble, pilot, and MAC data to form 16 slots for the 38.4 kbps data rate, in accordance with the HDR system. As shown in FIG. 6A, the first slot includes the following sequence of information: (1) 400 chips for the preamble, (2) 224 chips for pilot and MAC data, (3) another 624 chips for the remaining preamble, (4) 176 chips for the first group of data modulation symbols, (5) another 224 chips for pilot and MAC data, and (6) another 400 chips for the next group of data modulation symbols. Each subsequent slot (i.e., slots 2 through 16) includes (1) 400 chips for data modulation symbols, (2) 224 chips for pilot and MAC data, (3) another 800 chips for data modulation symbols, (4) another 224 chips for pilot and MAC data, and (5) another 400 chips for data modulation symbols.

As noted above, a sequence of 2560 data modulation symbols is generated for each Control Channel MAC Layer packet at the 38.4 kbps data rate. The data modulation symbols in the sequence are used to fill the first 2560 chips in the data partitions of the slots. The same data modulation symbols in the sequence are replicated and used to fill the remaining chips in the data partitions of the slots. For the 38.4 kbps data rate, 9.6 replications of the sequence of 2560 data modulation symbols are used to fill 24,576 chips in the data partitions of the 16 slots.

Figure 6B:
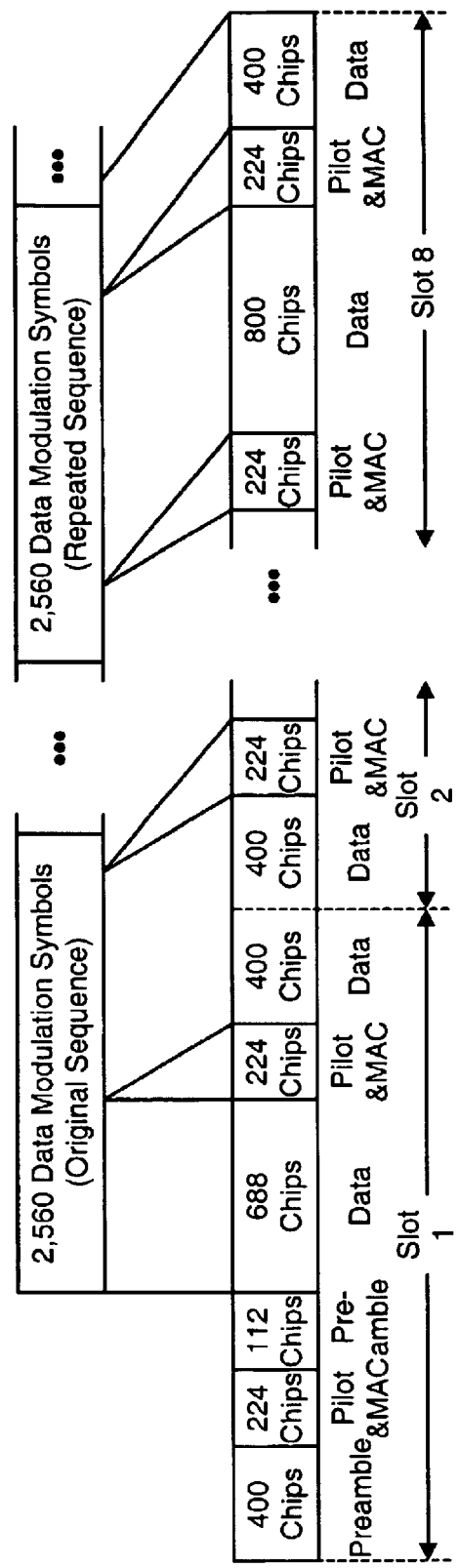

FIG. 6B is a diagram showing the time-division multiplexing of packet data, preamble, pilot, and MAC data to form 8 slots for the 76.8 kbps data rate, in accordance with the HDR system. As shown in FIG. 6B, the first slot includes the following sequence of information: (1) 400 chips for the preamble, (2) 224 chips for pilot and MAC data, (3) another 112 chips for the remaining preamble, (4) 688 chips for the first group of data modulation symbols, (5) another 224 chips for pilot and MAC data, and (6) another 400 chips for the next group of data modulation symbols. Each subsequent slot (i.e., slots 2 through 8) has the same format as that described above for the 38.4 kbps. Again, the sequence of 2560 data modulation symbols generated for a Control Channel MAC Layer packet is replicated as many times as needed to fill the 12,288 chips in the data partitions of the 8 slots.

Figure 7:
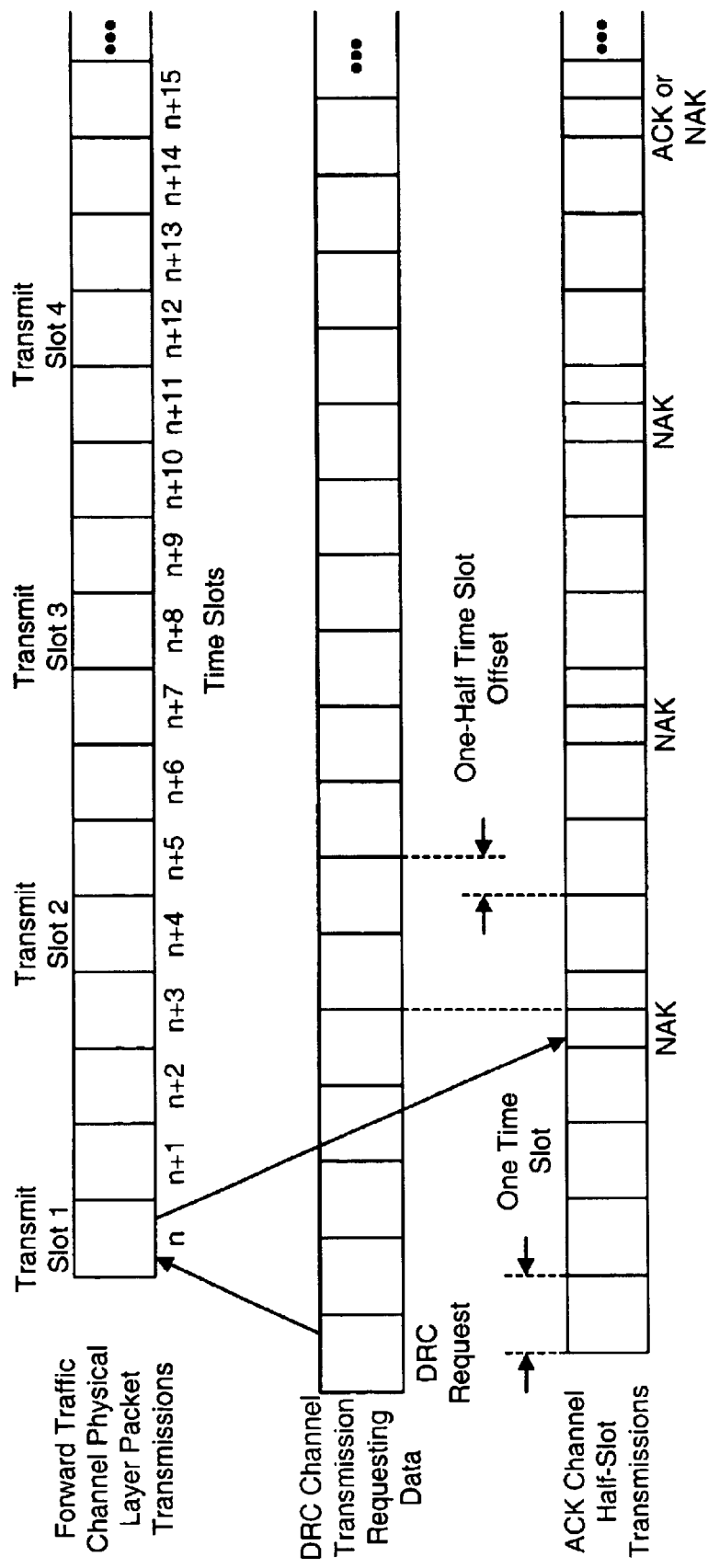
FIG. 7 is a diagram of a multi-slot interlaced packet transmission scheme that may be used to implement the time multiplexed transmission scheme of the invention.

FIG. 7 is a diagram of a multi-slot interlaced packet transmission scheme that may be used to implement the time multiplexed transmission scheme of the invention. In the specific example shown in FIG. 7, the interlaced transmission scheme is used to transmit a Physical Layer packet for a forward traffic channel. Initially, a request for a data transmission is received from an access terminal. In response, one or more Physical Layer packets are generated by an access point and transmitted to the access terminal starting at time slot n.

Synchronous and asynchronous control channel messages may be transmitted to the access terminals. Typically, asynchronous messages may be sent to access terminals that are assigned to traffic channels and are listening for messages at all times. Synchronous messages may be sent periodically to access terminals that may be in a sleep mode and are designated to wake up at particular time instances to listen for messages or are trying to establish a traffic channel.

For each time slot used to transmit the packet, the access terminal receives and processes (e.g., decovers, demodulates, deinterleaves, and decodes) the slot, and further determines whether the packet has been received correctly. As described above, the access terminal is able to recover the transmitted packet based on a partial transmission because the data modulation symbols for the packet are repeated a number of times for lower data rates. The access terminal then sends to the access point an acknowledgment (ACK) if the packet has been successfully received or a negative acknowledgment (NAK) otherwise. If an ACK is received from the access terminal, the access point stops transmission of the remaining slots (if any) for the packet. And if a NAK is received, the access point continues to transmit the next slot for the Physical Layer packet, until all slots for that packet are transmitted.

The hybrid acknowledgment/request (H-ARQ) scheme is used to allow early termination of the multi-slot packet transmission. If a positive acknowledgment is received from the access terminal before all slots for the packet have been transmitted, the remaining untransmitted slots are not transmitted. The acknowledgment is transmitted by the access terminal as soon as the packet is successfully received (i.e., the CRC checks after the decoding).

In the embodiment shown in FIG. 7, the transmission of a multi-slot Physical Layer packet is "interlaced" such that there are three intervening time slots between two adjacent time slots used for the Physical Layer packet. The slots for other Physical Layer packets may be transmitted in the three intervening time slots between the transmitted slots for this Physical Layer packet.

Figure 8:
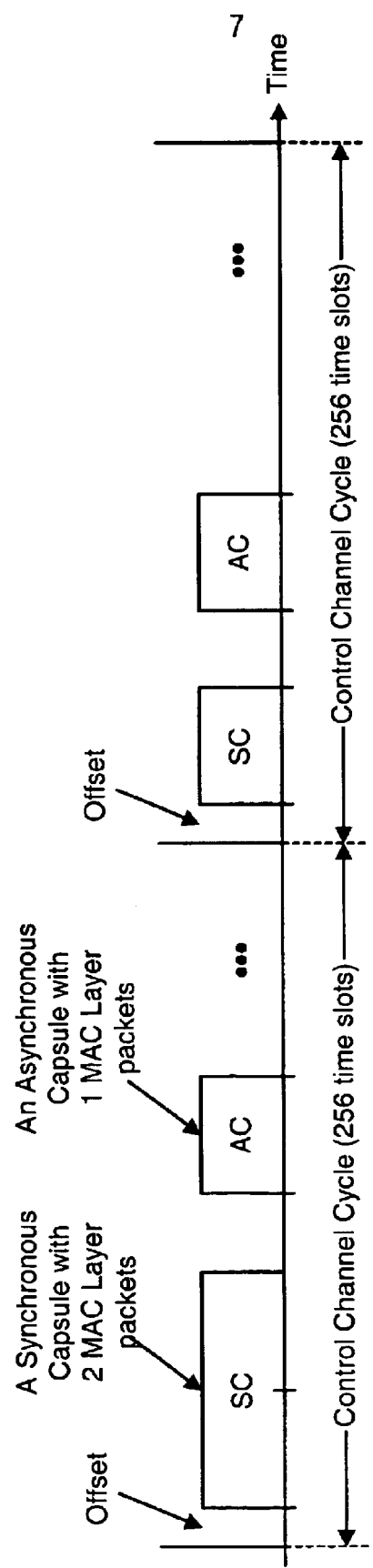
FIG. 8 is a timing diagram of an embodiment of the transmissions for a control channel.

FIG. 8 is a timing diagram of an embodiment of the transmissions for a control channel. A Control Channel MAC Layer packet may be transmitted via a synchronous capsule (which may include one or more such packets) or an asynchronous capsule (which includes one packet). The synchronous and asynchronous capsules may be transmitted at a particular "offset" (e.g., 0, 1, 2, or 3 time slots) from the start of a control channel cycle. The offset may be selected for each synchronous capsule via the CC header in the Control Channel MAC Layer packet, as described in further detail below.

Table 3 lists a control channel (CC) header format for a Control Channel MAC Layer packet, in accordance with the HDR system. The SynchronousCapsule field includes one bit that indicates whether the Control Channel MAC Layer packet is for a synchronous capsule or an asynchronous capsule. This field is set to one ("1") for the first packet in a synchronous capsule and zero ("0") otherwise. The LastPacket field includes one bit that is set to one ("1") for the last packet in a capsule and zero otherwise. The Offset field includes two bits that indicate the slot offset to be used for the transmission of the packets of synchronous capsule. This field for the first packet in the synchronous capsule is set to the designated slot offset (i.e., 0, 1, 2, or 3), and set to zero for other packets (if any).

TABLE 3

| Field | Length (bits) |
|---|---|
| SynchronousCapsule | 1 |
| LastPacket | 1 |
| Offset | 2 |
| Reserved | 4 |

The interlaced transmission scheme shown in FIG. 7 may be used to implement a staggered transmission scheme whereby cells are assigned to different slot phases for transmission to reduce interference to other cells. For the example shown in FIG. 7, time slots n, n+1, n+2, and n+3 may be associated with phases 0, 1, 2, and 3, respectively. A cell may be assigned to transmit on zero or more of these four phases for a particular duration of time. The phases may be assigned based on various factors such as, for example, the amount of interference desired to be reduced, the transmission capacity required by the cells, and so on.

Access terminals may be informed using system parameter messages of a staggering pattern, i.e., the set of cells/sectors that are allowed to transmit data on specific time slots. This information will allow the access terminals to exclude interference from cells that are blanked in predicting the carrier-to-interference (C/I) ratios that are used to predict data rates that can be transmitted in upcoming slots. This will allow the access terminals to take advantage of reduced interference to send data at higher rates.

The time multiplexed transmission scheme of the invention (and the staggered transmission scheme, which is one variant of the time multiplexed transmission scheme) is especially advantageous when the frequency reuse factor is low (e.g., K=1). This transmission scheme may be used for various applications and scenarios, some of which are described below.

In one application, the time multiplexed transmission scheme is used to support transmission at a particular data rate. For example, the control channel for the cells in the system may be nominally operated at the 76.8 kbps data rate. If the amount of interference is excessive at a particular cell and does not support this data rate, the control channel for this cell may then be transmitted at the lower 38.4 kbps data rate. And if the amount of interference is still excessive at this cell for this data rate, one or more interfering cells may be prevented from transmitting on a phase assigned to this cell for the control channel. By reducing the amount of interference, the required signal quality may be achieved for the transmitted data rate. In this case, the time multiplexed transmission scheme is used to blank one or more cells in designated time slots to reduce interference. The cell blanking is especially advantageous to support transmission at the lowest system data rate (e.g., 38.4 kbps), which might not otherwise be possible.

The cell blanking may be achieved in various manners. For example, a particular disadvantaged cell may be assigned a particular phase (e.g., phase 0) for transmission of a Physical Layer packet, and interfering cells may be prevented from transmitting on this phase. Other cells may be allowed to transmit on remaining phases (i.e., phases 1, 2, and 3), but not the phase assigned to the disadvantaged cell. The cell blanking may be applied for the time duration needed to transmit the packet, or may be applied for an extended time period (e.g., until the operating conditions improve, or the cell blanking is no longer desired for some other reasons).

In another application, the time multiplexed transmission scheme is used to support transmission at a higher data rate. By preventing interfering cells from transmitting, interference (especially at or near the cell boundary) may be substantially reduced and a higher data rate may be supported. For example, if the amount of interference in a particular cell supports a data rate of 76.8 kbps, reducing the interference may allow for transmission at 153.6 kbps, 307.2 kbps, or possibly an even higher data rate.

Figure 9:
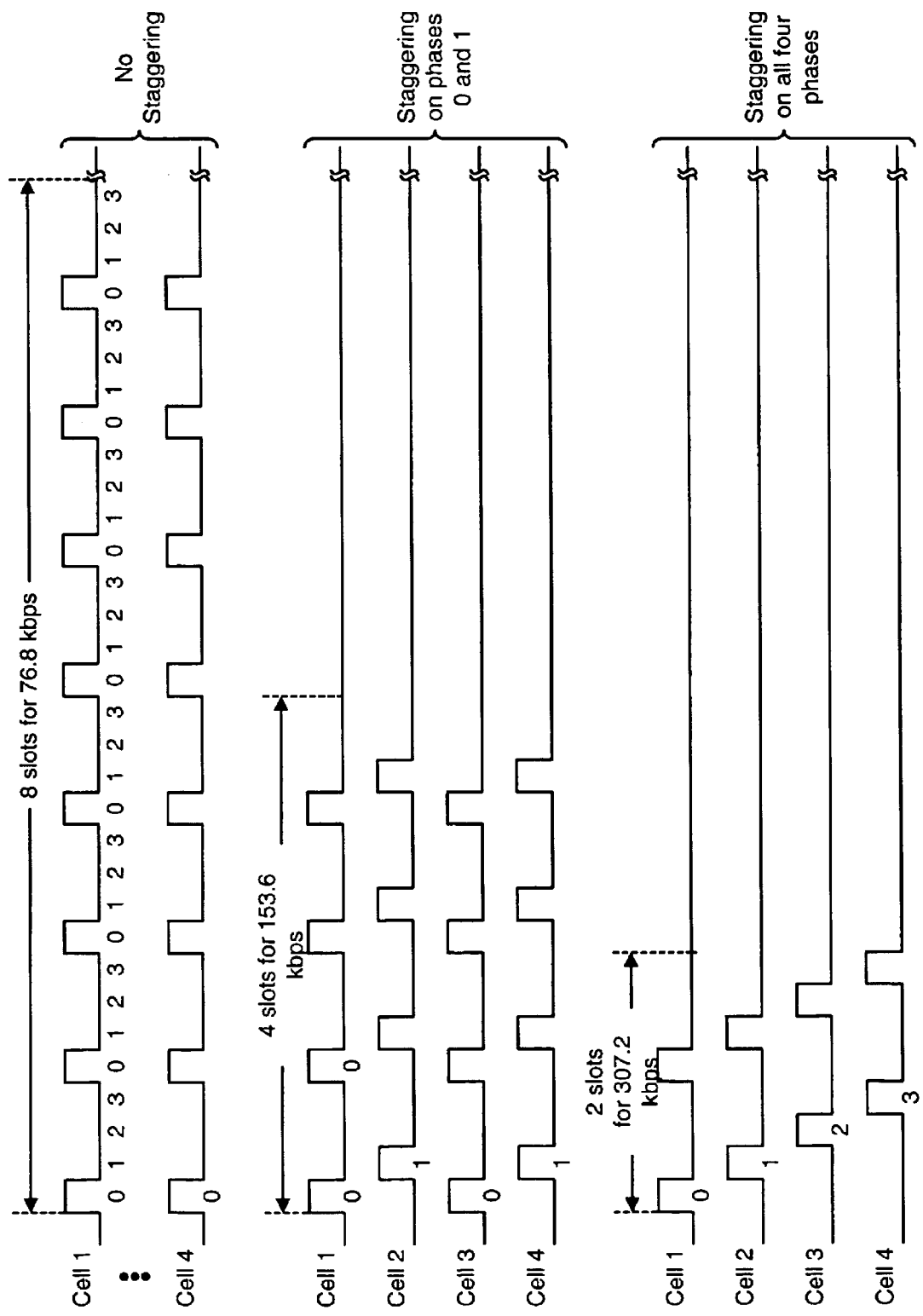
FIG. 9 is a diagram showing some implementations of the staggered transmission scheme to achieve higher data rates.

FIG. 9 is a diagram showing some implementations of the staggered transmission scheme to achieve higher data rates. At the top of FIG. 9, staggering is not performed, and cells 1 through 4 transmit their Physical Layer packets on the same phase (e.g., phase 0). For the 76.8 kbps data rate, the packets are transmitted over eight time slots. The remaining phases (e.g., phases 1, 2, and 3) may be used to transmit packets for traffic channels and/or other channels.

To support a higher data rate of 153.6 kbps, the cells may be operated to stagger their transmissions on two phases (e.g., phases 0 and 1). For the example shown, cells 1 and 3 are designated to transmit on phase 0, and cells 2 and 4 are designated to transmit on phase 1. At the 153.6 kbps data rate, the packets are transmitted over four times slots.

To support an even higher data rate of 307.2 kbps, the cells may be operated to stagger their transmission on all four phases (i.e., phases 0, 1, 2, and 3). For the example shown, cells 1 through 4 are designated to transmit on phases 0 through 3, respectively. At the 307.2 kbps data rate, the packets are transmitted over two times slots.

As shown in FIG. 9, the amount of staggering may be matched to the data rate to be supported. To support a higher data rate, more staggering may be required and more cells may need to be blanked.

In yet another application, the time multiplexed transmission scheme is used to support a variable-rate control channel. For the example shown in FIG. 9, the cells may be operated to transmit the control channel at any one of the three data rates shown. As described above and listed in Table 2, the preamble for each data rate has a unique length, and the access terminals are able to determine the data rate of a packet by processing the preamble.

In yet another application, the time multiplexed transmission scheme may be used to reduce interference to support a broadcast channel or some other signaling channel (e.g., a paging channel) that may be operated at a (relatively) high data rate (e.g., 300 kbps or higher). In one implementation, a number of times slots may be set aside for the broadcast channel. These time slots may be periodically or deterministically selected. For example and as shown in FIG. 9, eight consecutive time slots may be set aside for the broadcast channel every particular time period (e.g., every control channel cycle of 256 time slots). The remaining time slots may be used for other transmissions with or without cell blanking. The high data rate broadcast channel allows the access terminals to more quickly receive messages, since the channel is transmitted over a fewer number of time slots for the higher data rate. This may provide certain advantages.

In yet another application, the time multiplexed transmission scheme is used to support a transmission to a disadvantaged access terminal. The interference at an access terminal located at or near the cell boundary may be great. For example, the signal quality at access terminal 106d in FIG. 1 may be poor, and the bulk of the interference may be from the neighbor cell 104c. If the identities of the major interferers (e.g., cell 104c) are known, then the transmissions from these cells may be blanked during a transmission to the disadvantaged access terminal. In this case, it may only be necessary to blank the transmission from a limited number of interfering cells while allowing other cells to transmit. Upon completion of the transmission to the disadvantaged access terminal, the blanked cells may be allowed to resume their transmissions.

The above briefly describes some applications for the time multiplexed transmission scheme. This transmission scheme may also be used for other applications and this is within the scope of the invention.

The time multiplexed transmission scheme (and the staggered transmission scheme) may be used to implement a "time reuse" scheme, which may provide performance comparable to a frequency reuse scheme. However, the time reuse scheme provides numerous advantages. For example, the time reuse factor may be flexibly selected (e.g., based on the system's operating conditions and needs) and may further be dynamically adjusted to achieve the desired results. Moreover, the time duration over which to apply the time multiplexed transmission scheme may also be flexibly selected. As an example, time slots may be statistically selected and assigned by the system to the cells.

Figure 10:
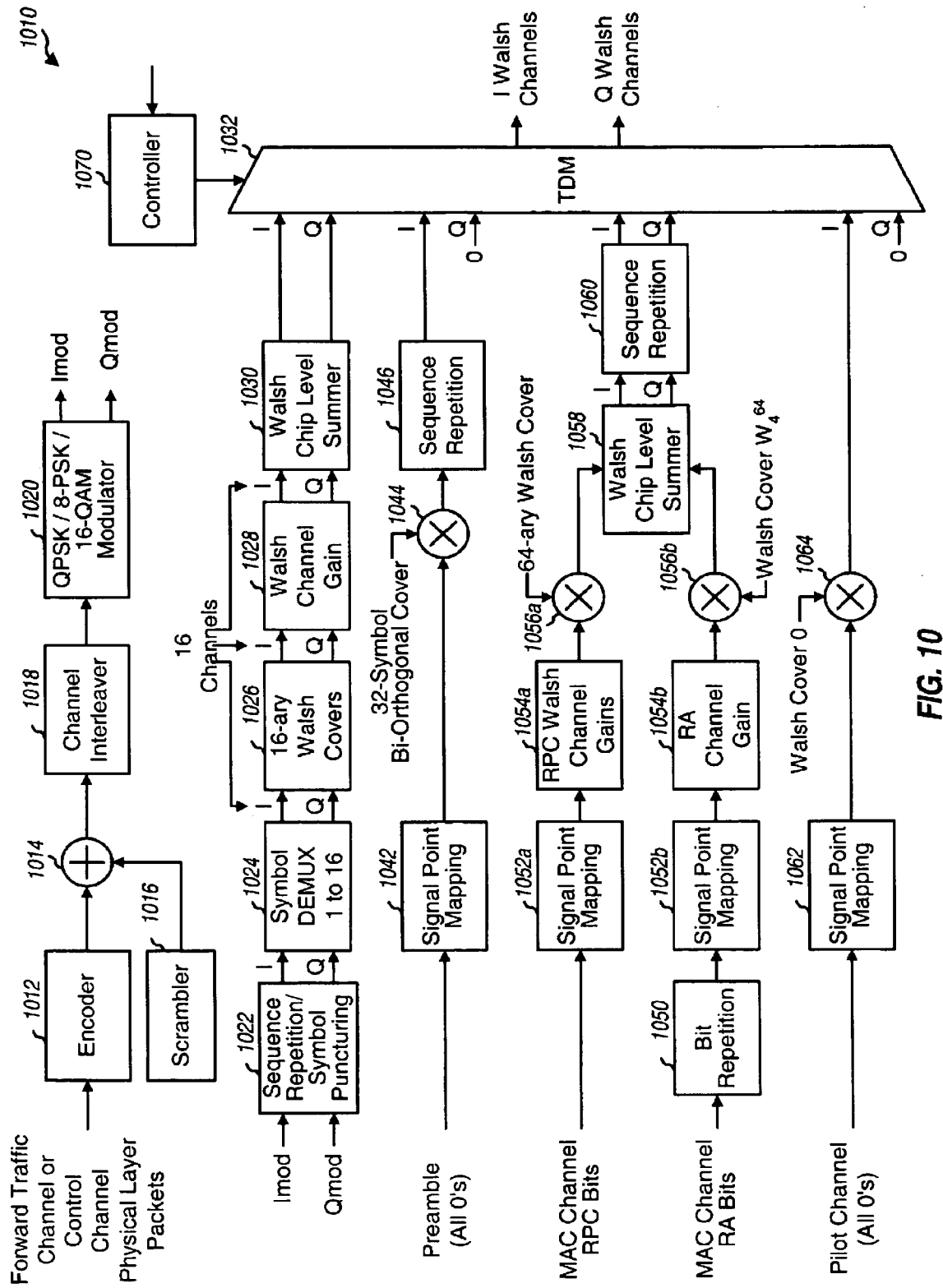
FIG. 10 is a block diagram of a forward link architecture capable of implementing the time multiplexed transmission scheme of the invention.

FIG. 10 is a block diagram of a forward link architecture capable of implementing the time multiplexed transmission scheme of the invention. This architecture is employed in the HDR system. Within a transmit data processor 1010, Physical Layer packets for the forward traffic channel or control channel are encoded by an encoder 1012 and scrambled by a (modulo-2) adder 1014 with a scrambling sequence from a scrambler 1016. The scrambled bits for each packet are then interleaved by a channel interleaver 1018, and the interleaved bits are modulated by a modulator 1020 using a particular modulation format (e.g., QPSK, 8-PSK, or 16-QAM), which is selected based on the data rate to be used for the packet. Modulator 1020 provides a sequence of (e.g., 2560) complex data modulation symbols for each packet.

The data modulation symbols are repeated and/or punctured in block 1022 to obtain the needed number of modulation symbols, as listed above in Table 1. The complex modulation symbols are then demultiplexed by a demultiplexer 1024 into 16 pairs of inphase (I) and quadrature (Q) channels. The modulation symbols in each inphase and quadrature channel are covered with a respective 16-ary Walsh cover by a 16-ary Walsh coverer 1026, and further scaled by a Walsh channel gain element 1028. The scaled Walsh symbols from the 16 inphase channels are summed together to form the I symbol stream, and the scaled Walsh symbols from the 16 quadrature channels are also summed together to form the Q symbol stream. The I and Q symbol streams are respectively provided to the first set of I and Q inputs of a time-division multiplexer (TDM) 1032.

The preamble data (a sequence of all zeros) for a packet is mapped (e.g., "0"→+1, and "1"→−1) by a signal mapping element 1042 and further covered by a coverer 1044 with a particular 32-bit bi-orthogonal sequence. This 32-bit sequence has a MAC index assigned to the particular control (or traffic) channel used to transmit the packet. The 32-bit covered sequence is then repeated a number of times in block 1046. The number of repetition is based on the length of the preamble, which is dependent on the data rate, as shown in Table 2. The preamble is then provided to a second I input of multiplexer 1032.

The MAC information (i.e., the RPC bits, and the RA bits which are repeated by a bit repetition element 1050) is mapped by a signal point mapping element 1052, scaled by a channel gain element 1054, and covered with a Walsh cover by a coverer 1056. The covered RPC and covered RA are summed by a summer 1058, repeated by a repeater 1060, and provided to a third set of I and Q inputs of multiplexer 1032.

The pilot data is mapped by a signal mapping element 1062, covered with a zero Walsh cover by a coverer 1064, and provided to the fourth I input of multiplexer 1032.

A controller 1070 provides the proper control signal(s) to multiplexer 1032 to generate the slot shown in FIG. 4 and the transmission formats shown in FIGS. 6A and 6B for the 38.4 kbps and 76.8 kbps, respectively. Controller 1070 further provides the control signals such that an idle slot is generated by multiplexer 1032 for each time slot in which transmission is prevented (i.e., blanked).

For clarity, various aspects and embodiments of the time multiplexed transmission scheme invention have been specifically described for a control channel in the HDR system. The time multiplexed transmission scheme may also be used for the traffic channels and other types of channel. For example, a data transmission on a traffic channel to a disadvantaged access terminal may be achieved by blanking the major interfering cell. As another example, data transmission at a higher data rate may be possible by blanking one or more interfering cells to achieve the required signal quality for the higher data rate. The time multiplexed transmission scheme may also be used for other wireless communication systems (e.g., other (synchronous and asynchronous) CDMA systems such as a W-CDMA system).

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for transmitting data from a plurality of cells in a wireless communication system, comprising:

defining time slots for a plurality of cells to transmit data to access terminals on a code division multiple access (CDMA) channel, wherein each time slot corresponds to a predetermined time interval;

associating the time slots with N different phases, wherein N is greater than one, wherein each successive group of N time slots includes N time slots respectively associated with the N different phases;

selecting a data transmission rate for at least one cell;

based on the selected data transmission rate, staggering data transmissions by (a) assigning a first set of one or more cells to transmit data in a first phase of the N phases and (b) assigning a second set of one or more cells to transmit data in a second phase, wherein a higher selected data transmission rate corresponds to a lower number of cells assigned to a phase; and enabling each cell to transmit data on the channel in the cell's assigned one or more phases, and preventing each cell from transmitting data on the channel in phases not assigned to the cell.

2. The method of claim 1, further comprising:

determining a particular level of interference to achieve for at least one transmission source; and identifying one or more interfering transmission sources contributing to the interference, and wherein the assigning is performed to achieve the particular level of interference for the at least one transmission source.

3. The method of claim 1, wherein N is four.

4. The method of claim 1, further comprising:

staggering data transmissions from the plurality of cells to reduce interference.

5. The method of claim 4, wherein the staggering is achieved by assigning each of the plurality of cells to a respective one of the N phases for the particular duration of time.

6. The method of claim 4, further comprising:

sending messages indicative of a particular staggering pattern to be used for transmission of traffic data.

7. The method of claim 4, further comprising:

increasing data rates of the data transmissions from the plurality of cells as a result of the staggering.

8. The method of claim 4, further comprising:

designating a particular number of time slots within each transmission cycle whereby data transmissions from the plurality of cells are staggered, wherein each transmission cycle includes a plurality of time slots.

9. The method of claim 1, further comprising:

assigning one or more phases to a particular cell for the particular duration of time; and for the particular duration of time, preventing remaining ones of the plurality of cells from transmitting on the one or more phases assigned to the particular cell.

10. The method of claim 1, wherein the particular data rate is a lowest data rate supported by the communication system.

11. The method of claim 1, wherein data transmission from at least one of the plurality of cells is for a control channel.

12. The method of claim 11, wherein each data transmission on the control channel is identified by a preamble included in the data transmission.

13. The method of claim 1, the communication system is a CDMA communication system.

14. A method for transmitting data from a plurality of cells in a wireless communication system, comprising:

defining time slots for data transmission, wherein each time slot corresponds to a predetermined time interval to allow receipt of an acknowledgement or a negative acknowledgement;

associating the time slots with N phases, wherein N is greater than one;

assigning each of the N phases to a respective set of one or more cells for a particular duration of time;

enabling data transmission at each of the plurality of cells on one or more phases assigned to the cell;

identifying, from among the plurality of cells, a disadvantaged cell experiencing excessive interference;

identifying one or more interfering cells contributing to the excessive interference; and assigning the one or more interfering cells to different phases than the phase assigned to the disadvantaged cell.

15. An access point in a wireless communication system, comprising:
    a data processor configured to receive and process a data packet to provide a plurality of slots; and
    a controller operatively coupled to the data processor and configured to direct transmission of the data over a plurality of time slots assigned to the access point to one or more access terminals on a code division multiple access (CDMA) channel, wherein each time slot corresponds to a predetermined time interval; to associate the time slots with N different phases, wherein N is greater than one, wherein each successive group of N time slots includes N time slots respectively associated with the N different phases; to select a data transmission rate; based on the selected data transmission rate, to stagger data transmissions with respect to other access points; and to prevent transmission over one or more time slots designated for no transmission by the access point.

16. The access point of claim 15, wherein the data packet includes a field indicative of an offset for the plurality of time slots assigned for transmission of the data packet.

* * * * *